O. H. ROGERS.
STEERING KNUCKLE.
APPLICATION FILED MAY 8, 1917.

1,272,534.

Patented July 16, 1918.

WITNESS:
Bernard Privat

INVENTOR.
Ovid H. Rogers
BY
Webster
ATTORNEY

UNITED STATES PATENT OFFICE.

OVID H. ROGERS, OF SACRAMENTO, CALIFORNIA, ASSIGNOR TO HIMSELF AND JACOB BRACK, TRUSTEES, OF SAN FRANCISCO, CALIFORNIA.

STEERING-KNUCKLE.

1,272,534.  Specification of Letters Patent.  Patented July 16, 1918.

Application filed May 8, 1917. Serial No. 167,190.

*To all whom it may concern:*

Be it known that I, OVID H. ROGERS, a citizen of the United States, residing at Sacramento, in the county of Sacramento, State of California, have invented certain new and useful Improvements in Steering-Knuckles; and I do declare the following to be a full, clear, and exact description of the same, reference being had to the accompanying drawings, and to the characters of reference marked thereon, which form a part of this application.

This invention relates to improvements in steering knuckles for the front wheels of motor vehicles. The object of the invention is to produce such a knuckle as will do away with the vertical bearing pins which are now used and the consequent lateral wear and strain to which they are now subjected. In the present form of steering knuckles a bolt or pin projects through the bushing on the steering spindle, on which bolt the spindle turns in order to guide the wheels in one direction or the other. In addition to this turning wear on the bolt the bushing tends to strike against the bolt laterally and very quickly wears the same so there is a large amount of play between the bushing and the bolt which makes a great deal of noise and is objectionable in a great many other ways. The aim of my invention is to replace the bolt and sleeve with a ball and socket joint, the socket being prevented from having rotary motion with respect to the ball and having only a horizontal turning movement for steering purposes. I hence provide a tongue secured to the socket and projecting into a bearing slot in the end of the ball, which tongue will have a perfectly smooth bearing surface on the ball both on its top and bottom which surfaces will support the vertical weight of the load and prevent any lateral play or wear on the ball and socket joint. Such supporting tongue will absolutely prevent any lateral play of the parts with respect to each other for the reason that it will support the socket and the wheel squarely in the center of the ball so that the weight and strain will be distributed equally throughout the socket.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
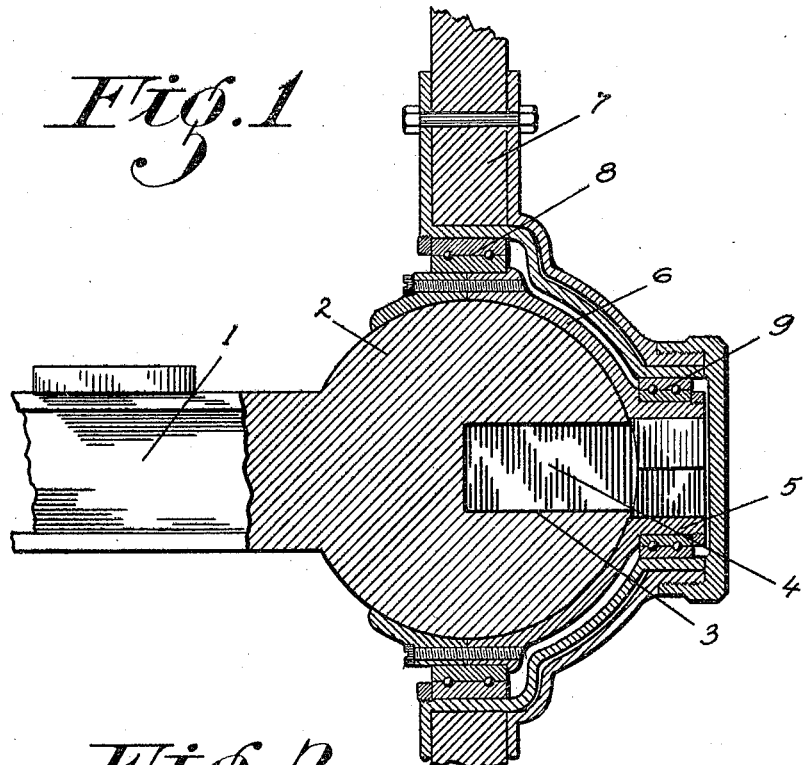
Figure 1 is a sectional view of the complete knuckle.
Figure 2:
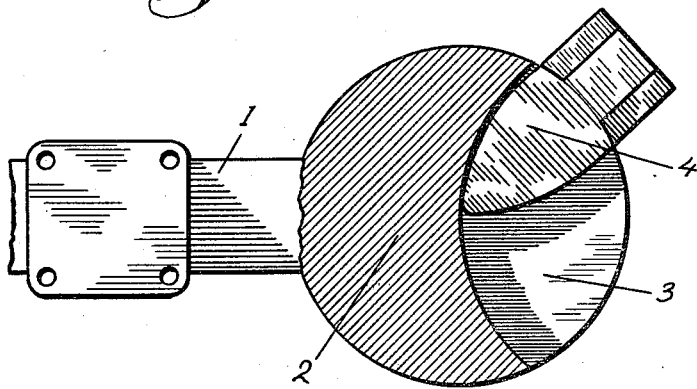
Fig. 2 is a sectional view of the ball showing the supporting tongue therein.

Referring now more particularly to the characters of reference on the drawings the numeral 1 designates the front axle of the vehicle on the end of which is formed a ball or sphere 2. In the outer end of such sphere 2 is a horizontal slot 3 of a semi-circular shape, the slot being large enough to allow the supporting tongue 4 to swing a sufficient distance in either direction when the wheels are steered in one direction or the other. This supporting tongue 4 has a smooth top and bottom surface which fits snugly against the top and bottom surfaces of the slot 3. The outer end of the plate 4 projects beyond the end of the ball 2 and fixed on such projecting end is a sleeve 5 on a socketed member 6, in which socket 6 the ball 2 is turnable. Rotary motion of the socket 6 on the ball 2 is prevented by reason of the tongue 4 projecting into the horizontal slot 3. The socket 6 and tongue 3 however can swing horizontally with respect to the ball 2 to allow of the wheel being steered in one direction or the other. The wheel 8 is turnably mounted as at 8 and 9 on the socket 6 in order to properly support the wheel relative to the said socket.

As will be seen the ball and socket joint supports the weight of the load and since the tongue 4 fits snugly in the horizontal slot 3 there can be no rotary movement of the socket 6 with respect to the ball 2. The possibility of excessive wear of the parts is minimized and the necessity of the use of vertical pins and sleeves is eliminated. And further, a steering knuckle of the type herein described is more perfect and efficient in its action and the frictional wearing between the parts is distributed equally over a considerable area instead of coming directly against the bolts as is the case in the present form of steering knuckles.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described my invention, what I claim as new and useful and desire to secure by Letters Patent is:

An axle terminating in a ball provided with a slot cut horizontally into its outer end, a plate projecting into and freely movable through the slot, the faces of the plate bearing against the top and bottom of the slot, a socket member turnable horizontally on the ball and fixed to the plate to prevent the plate from pulling out of the slot and also to hold the socket member against vertical rotary motion on the ball, and a wheel turnably mounted on the socket member.

In testimony whereof I affix my signature.

OVID H. ROGERS.

Copies of this patent may be obtained for five cents each, by addressing the "Commissioner of Patents, Washington, D. C."